United States Patent [19]

Brandl et al.

[11] 4,279,320
[45] Jul. 21, 1981

[54] HAND GRIP/FILLER NECK RECESS FOR A TRACTOR HOOD

[75] Inventors: Michael C. Brandl, Westmont; David T. Kataoka, Berwyn; George E. Bowman, Country Club Hills, all of Ill.

[73] Assignee: International Harvester Company, Chicago, Ill.

[21] Appl. No.: 114,433

[22] Filed: Jan. 22, 1980

[51] Int. Cl.³ .......................................... B62D 25/10
[52] U.S. Cl. .................................. 180/69 R; 141/98; 220/86 R; 296/1 C
[58] Field of Search .......................... 280/163, 164 R; 180/69 R; 296/1 C; 141/98, 392; 220/86 R, 85 F, 94 A; 16/DIG. 12; 105/461; 9/1.6; 182/90

[56] References Cited

U.S. PATENT DOCUMENTS

| | | | |
|---|---|---|---|
| 2,871,967 | 2/1959 | Du Shane | 180/69 R X |
| 3,407,836 | 10/1968 | Keiser | 220/1 V X |
| 3,971,456 | 7/1976 | Yonce | 280/163 X |
| 4,142,756 | 3/1979 | Henning et al. | 296/1 C |

Primary Examiner—David M. Mitchell
Assistant Examiner—Michael Mar

Attorney, Agent, or Firm—Douglas W. Rudy; Ronald C. Kamp; F. David AuBuchon

[57] ABSTRACT

The improvement of a hood of a tractor that has a filler neck passing through a neck aperture in the top surface of the hood. The neck aperture is transversely offset from the tractor's centerline. The improvement includes a downwardly projecting trough in the hood's top surface. The bottom of the trough is a major depression that is connected at four brake lines to the top surface by inner, outer, fore and aft sides. The major depression incorporates a pair of run-off apertures, with each run off aperture being adjacent one of the fore or aft sides. The neck aperture is located in the inner side of the trough, while the outer side of the trough contains a grip aperture. The improvement also includes a seal which resiliently and sealably connects the filler neck and the inner side of the trough. The improvement further includes a downwardly projecting hand grip that is sealably secured to the outer side of the trough in the grip aperture. The hand grip base is a primary depression with fore and aft ends connected by a surface that is substantially parallel to the tractor's centerline. The primary depression contains a pair of drain apertures that are each adjacent one of the fore or aft ends of the primary depression.

4 Claims, 3 Drawing Figures

U.S. Patent    Jul. 21, 1981    4,279,320
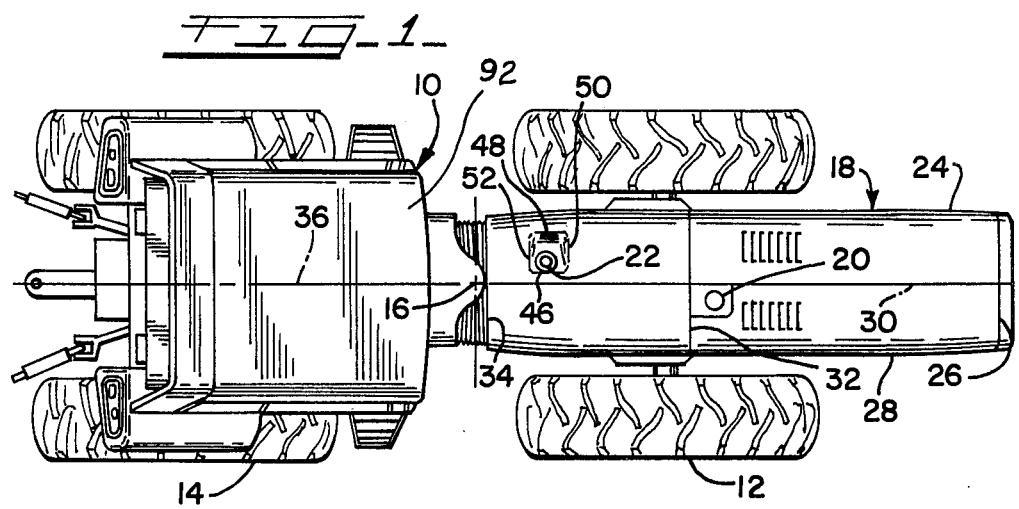
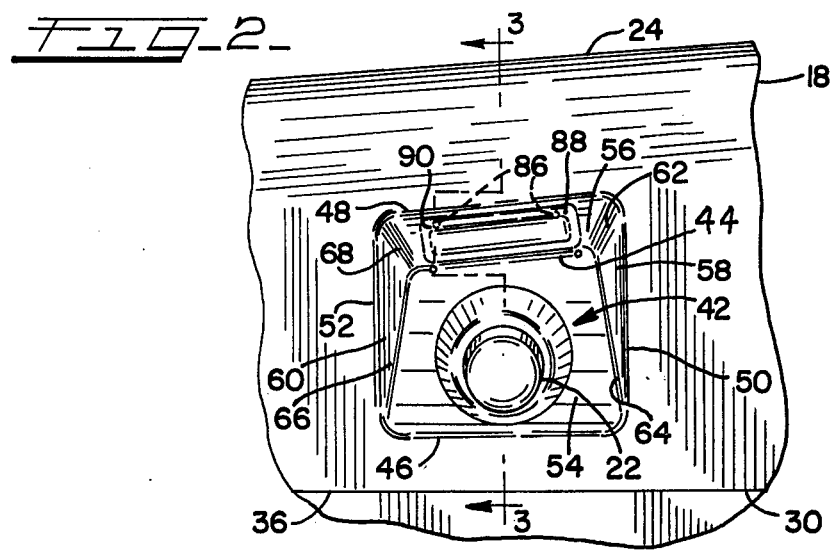
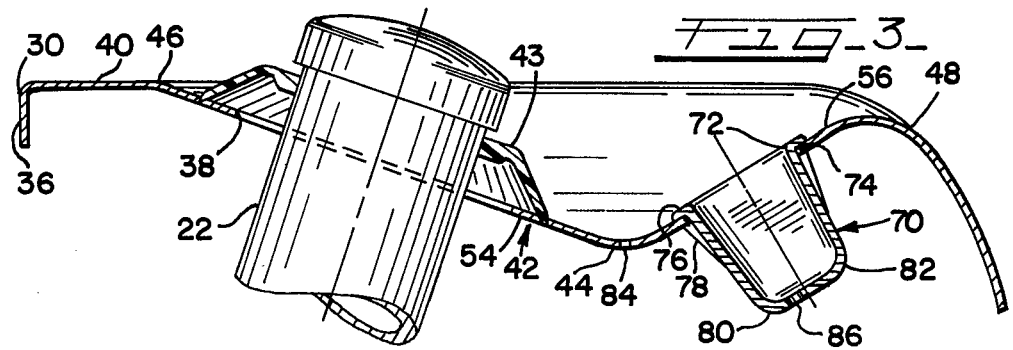

HAND GRIP/FILLER NECK RECESS FOR A TRACTOR HOOD

BACKGROUND OF THE INVENTION

This invention relates generally to tractor hoods and more particularly concerns tractor hoods which have a hand grip and are sealably connected to a filler neck.

There is a recent trend in the agricultural industry to improve the efficiency of crop production by utilizing higher horsepower tractors on larger units of farm land. Although higher horsepower tractors are more efficient while working in the larger fields, their horsepower requirements result in high profiles for the tractors.

The tractor's high profile will diminish their efficiency during servicing operations, because the high profile makes it more difficult for the operator to obtain access to the components that pass through the top of the elevated tractor hood, e.g. fuel tank and radiator filler necks. The operator's access is inhibited by his having to raise himself to the elevation of the top of the hood, and then stabilizing himself at the elevation as he performs the servicing operation on the components.

These tractors should therefore be equipped with a grip by which the operator can secure himself when he has reached the elevation of the top of the hood. In addition, the heighth of the grip and filler neck above the hood line should be minimized to avoid their interfering with the operator's line of sight when he is operating the tractor, while being fully functional when the tractor is being operated in the rain. Finally, the grip and filler neck passage through the hood should utilize a simple structure that can be economically manufactured without sacrificing the aesthetic qualities of the hood.

Accordingly, it is an object of the present invention to provide a hand grip/filler neck recess for the top of the hood of a tractor.

With more particularity, it is an object of the present invention to provide a hand grip/filler neck hood top arrangement which would be functional during operation of the tractor during the rain and which will not interfere with the operator's line of sight.

Finally, it is an object of the present invention to provide a low profile, hood top hand grip/filler neck arrangement that utilizes a simple structure to minimize the manufacturing cost without sacrificing the aesthetics of the hood.

SUMMARY OF THE INVENTION

The improvement of a hood of a tractor that has a filler neck passing through a neck aperture in the top surface of the hood. The neck aperture is transversely offset from the tractor's centerline. The improvement includes a downwardly projecting trough in the hood's top surface. The bottom of the trough is a major depression that is connected at four break lines to the top surface by inner, outer, fore and aft sides. The major depression incorporates a pair of run-off apertures, with each run-off aperture being adjacent one of the fore or aft sides. The neck aperture is located in the inner side of the trough while the outer side of the trough contains a grip aperture. The improvement also includes a seal which resiliently and sealably connects the filler neck and the inner side of the trough. The improvement further includes a downwardly projecting hand grip that is sealably secured to the outer side of the trough in the grip aperture. The hand grip base is a primary depression with fore and aft ends connected by a surface that is substantially parallel to the tractor's centerline. The primary depression contains a pair of drain apertures that are each adjacent one of the fore or aft ends of the primary depression.

BRIEF DESCRIPTION OF THE DRAWINGS

Other objects and advantages of the invention will become apparent upon reading the following detailed description and upon reference to the drawings, in which:

FIG. 1 is a top view of a tractor incorporating the present invention;

FIG. 2 is an enlarged top view of the present invention in the tractor of FIG. 1; and FIG. 3 is a sectional view along line 3—3 of FIG. 2.

While the invention will be described in connection with a preferred embodiment, it will be understood that it is not intended to limit the invention to that embodiment. On the contrary, it is intended to cover all alternatives, modifications and equivalents as may be included within the spirit and broad scope of the invention as defined by the appended claims.

DETAILED DESCRIPTION OF THE INVENTION

Turning first to FIG. 1, there is shown an articulated tractor 10 with its front section 12 pivotally connected to its rear section 14 at the axis of articulation 16. The front section 12 is covered by a hood 18, through which pass the exhaust stack 20 and fuel filler neck 22.

FIG. 1 also shows the style of the hood 18 being established by the contour lines 24, 26, 28, 30, 32 and 34 which define its outline. The contour line 30 lies on the tractor on line 36. Contour line 30 is also substantially parallel to contour lines 24 and 28 while being substantially perpendicular to contour lines 26, 32 and 34.

FIGS. 1 and 2 show the filler neck 22 to be transversely displaced from the tractor centerline 36, while FIG. 3 shows that the filler neck actually passes through the filler neck aperture 38 of the top surface 40 of the hood 18. FIG. 3 also shows the neck aperture 38 to be located within the trough 42 of the present invention, with the filler neck 22 being sealably and resiliently secured to the top surface 40 by the resilient seal 43.

The trough 42 will be readily understood by referring to FIGS. 2 and 3, which show the trough 42 to be substantially V-shaped. The bottom of the trough 42 is a substantially linear major depression 44 that is substantially parallel to the tractor centerline 36. The major depression 44 is connected at break lines 46, 48, 50 and 52 to the top surface 40 by inner 54, outer 56, fore 58 and aft 60 sides, respectively. The sides of the trough 44 are also interconnected by blend sections 62, 64, 66 and 68. The trough 44 is arranged in this manner to make it possible for the trough to be formed by plastically deforming the material in the top surface 40 of the hood, thereby eliminating the need for and the expense of a separately fabricated and attached element.

Although the trough is formed by this plastic deformation of material, the preferred embodiment utilizes a hand grip 70 that is not formed from the top surface 40 of the hood 18. The separate fabrication of the hand grip 70 provides a simplified die for the production of the trough 42, while also insuring a protruding surface 72 to stabilize the operator's grip on the hood 18.

Since the hand grip 70 is not part of the material of top surface 40 of the hood, the outer side 56 of the trough 42 contains a grip aperture 74. The preferred embodiment's grip aperture 74 and the hand grip 70 are substantially rectangular (see FIG. 2), with the hand grip 70 being sealably secured within the grip aperture 74 by retaining edge 76 and lip 78 (see FIG. 3). FIG. 3 also shows the portion of the hand grip 70, which protrudes downwardly to have a rectangular cross section. This cross section produces a base that has a primary depression 80 at its lowest point, with a secondary depression 82 above and outside the primary depression 80. In the preferred embodiment the primary 80 and secondary 82 depressions, like the major depression 44, are substantially parallel to the tractor centerline.

The major 44 and primary 80 depressions are also similar in that they each contain a pair of apertures which prevent the collection of rainwater by the trough. The major depression 44 contains two overflow apertures 84 that provide an escape for rainwater which lands on the portion of the trough formed from the material of the top section 40, and which overflows from the water collected in the hand grip 70. The overflow from the hand grip 70 will only occur on rare occasions, because the primary depression 80 of the hand grip 70 contains a pair of drain apertures 86 which allow rainwater to escape from the hand grip 70.

It should be noted that the drain apertures 86 are each located at either the fore 88 or aft 90 ends of the primary depression 80, and that the overflow apertures 84 are each located adjacent either the fore 58 or aft 60 sides of the trough 42. This orientation, combined with the fact that the major depression 44 is between the primary depression 80 and the tractor centerline 36, insures adequate drainage of the trough 42 and hand grip 70 regardless of the slope of the terrain on which the tractor is being operated.

It should also be noted that the concave figuration of the trough/hand grip arrangement of the preferred embodiment gives the present invention a low profile that will not obstruct the operator's line of sight from the cab 92 over the hood 18. In addition, the preferred embodiment's forming the concave trough from the material of the hood, while separately fabricating the hand grip results in a simple structure for the hood top hand grip/filler neck arrangement, thereby minimizing the manufacturing cost of the present invention.

Additional study of FIG. 1 will show the preferred embodiment break lines 46, 48, 50, and 52 are substantially parallel to the contour lines 24, 30, 32 and 34 of the hood 18. This parallelism produces a smooth blending of the trough 42 and the major styling/contour lines of the hood, thereby maintaining the asthetic appeal of the hood styling. From the foregoing it will be seen that the preferred embodiment's filler neck/hand grip arrangement provides a stylish, economical and consistently functional means for the operator to brace himself, when he reaches the elevation of the hood top.

The operator can use either an independent ladder or a step assembly attached to the tractor to obtain the hood top elevation. Whether the operator uses an independent ladder or an attached step, the present invention provides him with a hand grip that will secure him to the tractor in the vicinity of and at the elevation of the components he is servicing.

Thus it is apparent that there has been provided, in accordance with the invention, a hand grip/filler neck arrangement for a tractor hood that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. The improvement of a hood for a tractor having a filler neck passing through a neck aperture in the top surface of the hood, said neck aperture being transversely spaced apart from the centerline of the tractor, the improvement including, in combination:

a downwardly projecting trough in said top surface, the bottom of said trough being a major depression substantially parallel to said tractor centerline and connected to said top surface at four break lines by inner, outer, fore and aft sides, said major depression including a pair of run-off apertures, each of said run-off apertures being adjacent one of said fore and aft sides, said inner side including said neck aperture and said outer side including a grip aperture;

means for resiliently and sealably connecting said filler neck and said inner side; and a downwardly projecting hand grip sealably secured to said outer side in said grip aperture, the base of said hand grip being a primary depression with fore and aft ends connected by a surface substantially parallel to said tractor centerline, said primary depression including a pair of drain apertures, each of said drain apertures adjacent one of said fore and aft ends.

2. The invention of claim 1, wherein:

said hood includes four substantially linear contour lines, each of said contour lines adjacent said break lines;

said primary and major depressions are substantially linear; and said break lines are substantially linear, with each of said break lines paralleling said adjacent contour lines.

3. The invention of claims 1 or 2, wherein:

said grip aperture and said hand grip are substantially rectangular;

said downward projection of said trough is V-shaped; and said downward projection of said hand grip is rectangular, said primary depression being below and between said tractor centerline and a secondary depression.

4. The invention of claims 1 or 2, wherein:

said major depression is above said primary depression, and between said tractor centerline and said primary depression.

* * * * *